July 22, 1952 R. B. SHORE 2,603,933
SIDE DELIVERY RAKE
Filed July 31, 1950 2 SHEETS—SHEET 1
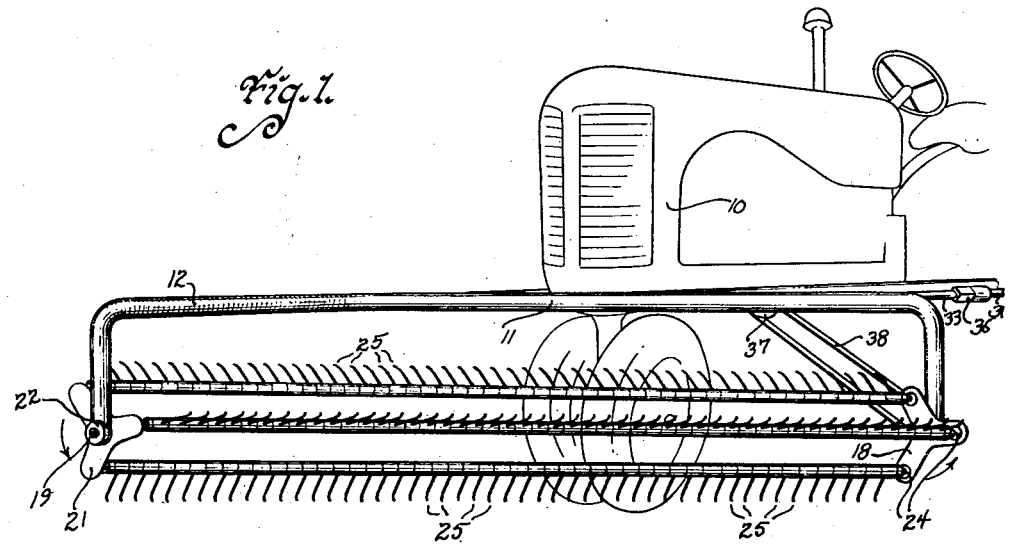
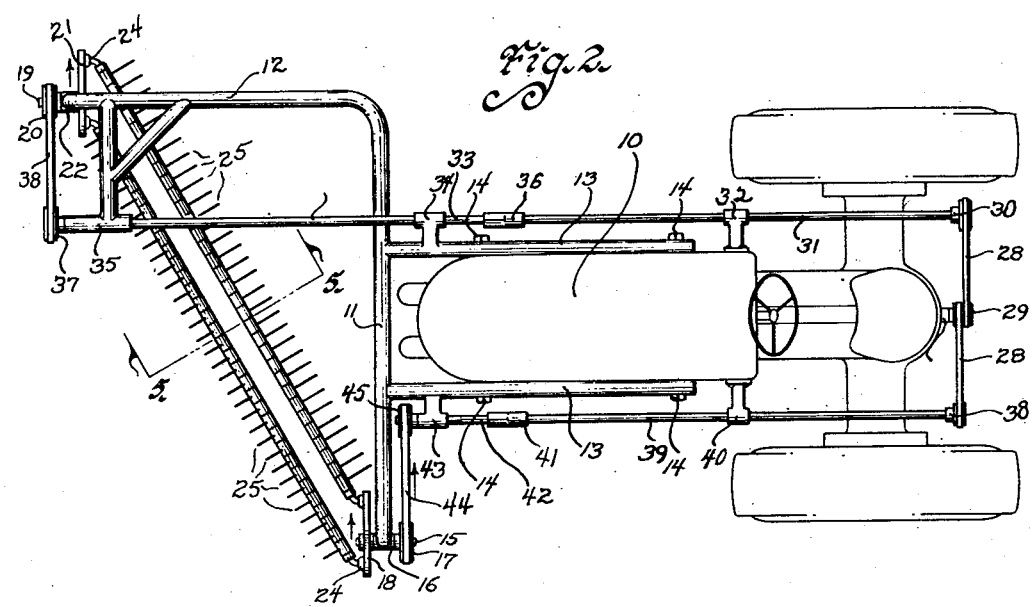
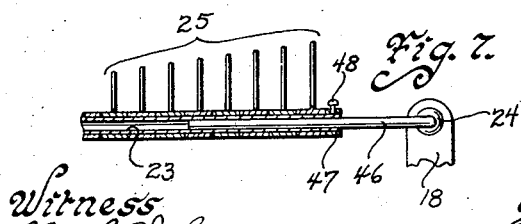
Inventor
Richard B. Shore
by M. Halbert Dick
Attorney
Witness
Edward P. Seeley July 22, 1952 R. B. SHORE 2,603,933
SIDE DELIVERY RAKE
Filed July 31, 1950 2 SHEETS—SHEET 2
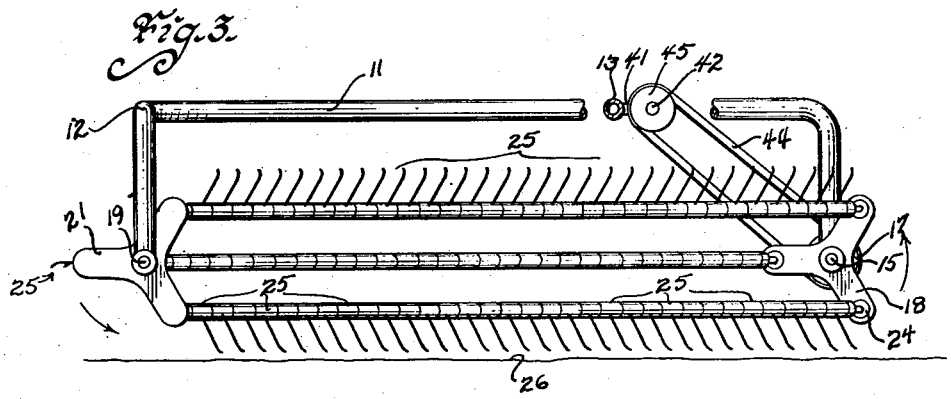
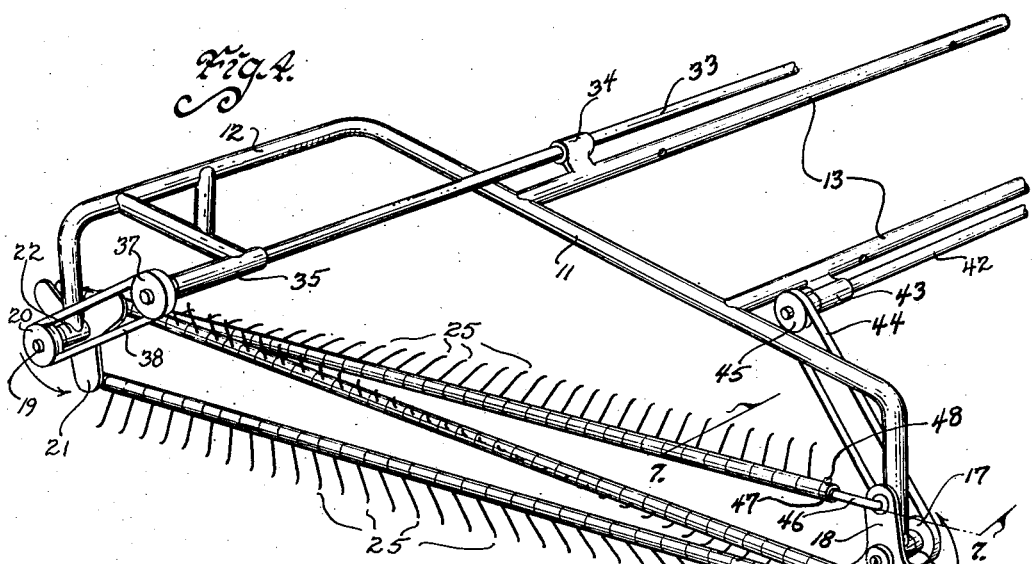
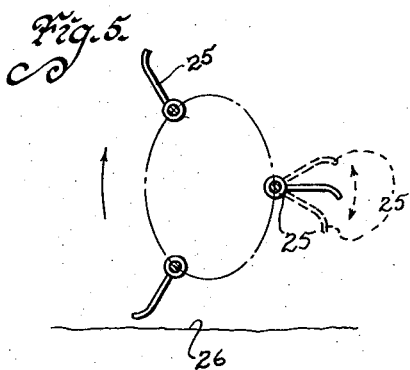
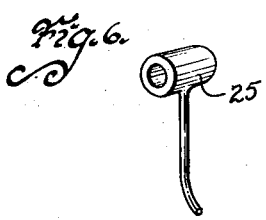
Inventor
Richard B. Shore
by M. Talbert Kirk
Attorney
Witness
Edward P. Seeley Patented July 22, 1952

2,603,933

UNITED STATES PATENT OFFICE 2,603,933

SIDE DELIVERY RAKE

Richard B. Shore, Waterloo, Iowa

Application July 31, 1950, Serial No. 176,861

4 Claims. (Cl. 56—27)

The principal object of my invention is to provide a side delivery rake that has a sidewise lifting motion simultaneously with its rotary raking action.

It is a further object of my invention to provide a side delivery rake in which the foremost tine on any one rake shaft or rod contacts the surface to be raked just before the next succeeding tine and so on throughout the length of each rake shaft.

It is yet another object of my invention to provide a power rake that has the circular raking action of any given tine disposed at right angles to the axis of the machine that coincides with the direction of movement of the machine during normal operation.

It is still a further object of my invention to provide a power rake durable in use and economical of manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my device showing its relative operating position on a prime mover such as a tractor, a fragment of which is included.

Fig. 2 is a top view of my device on a prime mover to illustrate the method of attachment and means for powering the rake with the power take-off of the prime mover.

Fig. 3 is a front view of the rake alone with a portion of the frame broken away to more fully illustrate the driving pulley arrangement.

Fig. 4 is a perspective view of a modified form of my device.

Fig. 5 is a cross-sectional view of the path described by the teeth during rotation of the rake as seen when taken on the line 5—5 of Fig. 2. Dotted lines are used to illustrate the swingable character of the teeth as mounted.

Fig. 6 is a perspective view of a single tine showing its construction.

Fig. 7 is a fragmentary cross-sectional view of one end of the telescoping rake shaft of the modified structure shown in Fig. 4 and taken on the line 7—7 of that figure.

In the drawings the numeral 10 designates a prime mover such as a farm tractor on which my L-shaped frame, having a longer leg 11 and a shorter leg 12, is mounted by means of braces 13, that are rigidly secured to said leg 11, being detachably secured to the power unit 10 with bolts 14 or the like as clearly illustrated in Fig. 2. Shaft 15 is journaled in bearing 16 that is rigidly mounted to the free end of leg 11. A pulley 17 is secured to the rear end of shaft 15 while its other end carries rake end 18. At the free end of leg 12 we find a similar structure with shaft 19 having pulley 20 on one end and rake end 21 on the other, the whole assembly being journaled in bearing 22 that is rigidly mounted on leg 12 of the L-frame. Rake rods 23 are swivelly secured to rotatable members 18 and 21 at opposite ends respectively by ball-socket joints 24. On each rake shaft 23 a series of curved end tines 25 are swingably mounted and are held in the raking position with respect to a surface to be raked 26 as illustrated in Fig. 5 by centrifugal force. The dotted line teeth in Fig. 5 show the swingable character of the tines mountings which allow them to yield if they encounter excessive resistance.

To rotate the rake, power is supplied by the power take-off 27 of the tractor 10 like by means of belts 28 engaging dual pulley 29. One belt drives a pulley 30 secured to a shaft 31 rotatably supported by a bracket 32 secured to the prime mover 10. An extension shaft 33 on the rake is journaled in bearing supports 34 and 35 that are appropriately secured to the rake frame. Joint 36 causes shaft 33 and 31 to rotate together when the rake is operating. Any rotation of shaft 33 is transmitted to pulley 37 that is mounted on the outer end of the shaft. The power system to the rake at one end is completed by belt 38 reeved over pulleys 20 and 37. A similar system transmits power to the other end of the rake assembly by means of the second belt 28 driving pulley 38 and, therefore, shaft 39 to which pulley 38 is secured. Bearing bracket 40 that is appropriately secured to the tractor or like rotatably supports both pulley 38 and shaft 39 while joint 41 connects the system thus far to shaft 42 that is rotatably mounted in bearing 43 extending from one rake frame support 13. Torque from shaft 42 is transmitted to pulley 17 by means of belt 44 being reeved over the last mentioned pulley and one designated 45 that is mounted on shaft 42. Thus whenever power take-off 27 is actuated the belts, pulleys, and shafts just described will cause the rake ends to rotate. It will be seen from Fig. 2, however, that their plane of rotation is perpendicular to the direction of movement of the rake frame during normal operation. In this manner the material to be raked is thrown toward the left not only because the rake is slanted but by reason of the effective plane of rotation of the tongs of the rake naturally causing this sideways raking.

In the modified form of my device illustrated in Fig. 4, I have carried this side raking action one step further by advancing the forward rake end some degrees in the direction of rotation. Since rake shafts 23 are required to change length when the two rake ends are rotated out of synchronization, I have provided a telescoping end 46 for the rake rods 23 which then must be hollow as shown in Fig. 7 to slidably embrace member 46. A collar 47 is secured by set screw 48 to the end of rake shaft 23 to keep tines 25 in place. Another necessary provision of this modification has been to lengthen the tines 25 from each end toward the center of rods 23. In the modified form since one end of any given rake rod is moving up when the opposite end is moving down, the center of the rods, like the center of a teeter-totter, tend to describe a much smaller circle than do the ends. To permit all the teeth to peform correctly, therefore, each succeeding tine proceeding from both ends toward the center must be slightly longer than the one last preceding it. The longest teeth will be the center ones of each rod. The action of this modified form of my rake is similar to the basic form differing mainly in that the teeth at the forward end of any one rake rod reach the surface to be raked slightly in advance of the tine next behind it and so forth throughout the length of the rod. Thus material raked is tossed along one rod from one group of teeth to the next and so on to the left side of the machine.

Some changes may be made in the construction and arrangement of my side delivery rake without departing from the real spirit and purpose of my invention, and it is my intention to cover by my claims, any modified forms of structure or use of mechanical equivalents which may be reasonably included within their scope.

I claim:

1. In a side delivery rake, a frame, a first rake end rotatably secured to one end of said frame, a second rake end rotatably secured to the other end of said frame, a plurality of telescoping rake rods each having one end swivelly secured to said first said rake end and the other end of each of said bars swivelly secured to the other of said rake ends, a means for connecting said first rake end to a source of power to rotate said first rake end, a second means for connecting said second rake end to a source of power to rotate said second rake end, and a plurality of tines mounted on each of said rake rods.

2. In a side delivery rake, a frame, a first rake end rotatably secured to one end of said frame, a second rake end rotatably secured to the other end of said frame, a plurality of telescoping rake rods each having one end swivelly secured to said first said rake end and the other end of each of said bars swivelly secured to the other of said rake ends, a means for connecting said first rake end to a source of power to rotate said first rake end, a second means for connecting said second rake end to a source of power to rotate said second rake end, and a plurality of tines mounted on each of said rake rods; said tines at the ends of said rake rods being shorter than those in the center of said rake rods.

3. In a side delivery rake, a frame, a first rake end rotatably secured to one end of said frame, a second rake end rotatably secured to the other end of said frame, a plurality of telescoping rake rods each having one end swivelly secured to said first said rake end and the other end of each of said bars swivelly secured to the other of said rake ends, a means for connecting said first rake end to a source of power to rotate said first rake end, a second means for connecting said second rake end to a source of power to rotate said second rake end, and a plurality of tines mounted on each of said rake rods; said tines at the ends of said rake rods being shorter than those in the center of said rake rods; said tines between each end and the center of each of said rake rods being relatively short if positioned adjacent the end tines and each succeeding tine as progress is made toward the center of said rake rods being longer than the preceding one.

4. In a side delivery rake, a frame, a first rake end rotatably secured to one end of said frame, a second rake end rotatably secured to the other end of said frame, a plurality of telescoping rake rods each having one end swivelly secured to said first said rake end and the other end of each of said bars swivelly secured to the other of said rake ends, a means for connecting said first rake end to a source of power to rotate said first rake end, a second means for connecting said second rake end to a source of power to rotate said second rake end, and a plurality of tines swingably mounted on each of said rake rods.

RICHARD B. SHORE.

REFERENCES CITED

The following references are of record in the file of this patent:

UNITED STATES PATENTS

| Number | Name | Date |
| --- | --- | --- |
| 1,047,147 | Bamford | Dec. 17, 1912 |
| 2,040,692 | Hitchcock | May 12, 1936 |